(12) United States Patent
Hwang et al.

(10) Patent No.: US 11,495,012 B1
(45) Date of Patent: Nov. 8, 2022

(54) SEMI-SUPERVISED LEARNING METHOD FOR OBJECT DETECTION IN AUTONOMOUS VEHICLE AND SERVER FOR PERFORMING SEMI-SUPERVISED LEARNING FOR OBJECT DETECTION IN AUTONOMOUS VEHICLE

(71) Applicant: SEOUL NATIONAL UNIVERSITY R&DB FOUNDATION, Seoul (KR)

(72) Inventors: Sun Wook Hwang, Sejong-si (KR); Young Seok Kim, Seoul (KR); Hyung Sin Kim, Seoul (KR); Sae Woong Bahk, Seoul (KR)

(73) Assignee: SEOUL NATIONAL UNIVERSITY R&DB FOUNDATION, Sejong-si (KR)

( * ) Notice: Subject to any disclaimer, the term of this patent is extended or adjusted under 35 U.S.C. 154(b) by 0 days.

(21) Appl. No.: 17/659,878

(22) Filed: Apr. 20, 2022

(30) Foreign Application Priority Data

Nov. 19, 2021 (KR) .................. 10-2021-0160432

(51) Int. Cl.
*G06N 20/00* (2019.01)
*G06V 10/774* (2022.01)
*G06V 10/776* (2022.01)
*G06V 20/56* (2022.01)

(52) U.S. Cl.
CPC ......... *G06V 10/7753* (2022.01); *G06N 20/00* (2019.01); *G06V 10/776* (2022.01); *G06V 10/7747* (2022.01); *G06V 20/56* (2022.01)

(58) Field of Classification Search
None
See application file for complete search history.

(56) References Cited

U.S. PATENT DOCUMENTS

| | | | | |
|---|---|---|---|---|
| 2021/0403036 A1* | 12/2021 | Danna | ................. | G06F 16/2457 |
| 2022/0180528 A1* | 6/2022 | Dundar | .................. | G06T 7/194 |
| 2022/0222480 A1* | 7/2022 | Jiang | ...................... | G06V 10/22 |

FOREIGN PATENT DOCUMENTS

| | | | |
|---|---|---|---|
| KR | 10-2018-0118596 A | 10/2018 | |
| KR | 10-2021-0064067 A | 6/2021 | |
| KR | 10-2021-0106864 A | 8/2021 | |
| WO | WO-2022042002 A1 * | 3/2022 | ........... G06K 9/6256 |

OTHER PUBLICATIONS

WO-2022042002-A1 Translation (Year: 2022).*
Notice of Office Action from KR 10-2021-0160432, dated Feb. 8, 2022.
Notice of Allowance from KR 10-2021-0160432, dated Apr. 20, 2022.

* cited by examiner

*Primary Examiner* — Soo Shin
(74) *Attorney, Agent, or Firm* — Mark T. Vogelbacker; Eckert Seamans Cherin & Mellott, LLC (57) ABSTRACT

A semi-supervised learning method for object detection in an autonomous vehicle and a device for performing semi-supervised learning for object detection in an autonomous vehicle can include receiving, by a server, no-label voxel data from a vehicle, performing, by the server, a data-based update on a server object detection model on the basis of label voxel data and the no-label voxel data, determining, by the server, a loss value on the basis of the label voxel data and the no-label voxel data, and performing, by the server, a loss-based update on the server object detection model using the loss value.

4 Claims, 5 Drawing Sheets

FIG. 5

SEMI-SUPERVISED LEARNING METHOD FOR OBJECT DETECTION IN AUTONOMOUS VEHICLE AND SERVER FOR PERFORMING SEMI-SUPERVISED LEARNING FOR OBJECT DETECTION IN AUTONOMOUS VEHICLE

CROSS-REFERENCE TO RELATED APPLICATION

This application claims priority to and the benefit of Korean Patent Application No. 10-2021-0160432, filed on Nov. 19, 2021, the disclosure of which is incorporated herein by reference in its entirety.

BACKGROUND

1. Field of the Invention

The present invention relates to a semi-supervised learning method for object detection in an autonomous vehicle and a device for performing the same. More specifically, the present invention relates to a semi-supervised learning method for object detection in an autonomous vehicle which allows continuous learning of object detection for an autonomous vehicle through semi-supervised learning on the basis of image information transmitted from a vehicle and a device for performing the same.

2. Discussion of Related Art

This work was supported by the National Research Foundation of Korea(NRF) grant funded by the Korea government(MSIT) (No. 2020R1A2C2101815).

Object detection is a traditional challenge in the computer vision field. Lately, object detection has been applied and developed in many fields, such as security, service, factory automation, etc. In particular, the importance of object detection is increasing in the autonomous driving environment. Artificial intelligence is being rapidly researched with the development of graphics processing units (GPUs), and autonomous vehicles are also under rapid development.

There are some requirements for a deep-learning-based object detector to operate well in an autonomous driving environment.

First, real-time characteristics should be ensured to immediately handle various situations in an autonomous driving environment. Second, it is necessary to ensure accurate location detection and class classification in an autonomous driving environment. However, the real-time characteristics and accuracy are in a trade-off relationship, and thus it is difficult to improve both.

Various methods for accurately detecting an object in real time in an autonomous vehicle are being researched, and continuous research is required for the introduction of autonomous vehicles.

SUMMARY OF THE INVENTION

The present invention is directed to solving all the above-described problems.

The present invention is also directed to improving learning efficiency while simultaneously using labeled voxel data and unlabeled voxel data, and allowing continuous upgrades of an object detection model based on voxel data received from a vehicle even while reducing costs and efforts put into labeling.

The present invention is also directed to generating voxel data for an image and allowing protection of personal information through a deidentification procedure for the voxel data in artificial-intelligence-based learning.

According to an aspect of the present invention, there is provided a semi-supervised learning method for object detection in an autonomous vehicle, the semi-supervised learning method including receiving, by a server, no-label voxel data from a vehicle, performing, by the server, a data-based update on a server object detection model on the basis of label voxel data and the no-label voxel data, determining, by the server, a loss value on the basis of the label voxel data and the no-label voxel data, and performing, by the server, a loss-based update on the server object detection model using the loss value.

The data-based update may be performed on the basis of the label voxel data, flipped label voxel data obtained by flipping the label voxel data, the no-label voxel data, and flipped no-label voxel data obtained by flipping the no-label voxel data, and the flipped label voxel data and the flipped no-label voxel data may be generated through flipping based on a travel direction of the vehicle.

The loss value may include a supervised loss and a consistency loss, the supervised loss may be determined on the basis of a determination result obtained by inputting object information included in the label voxel data and the label voxel data into the server object detection model, the consistency loss may include a first consistency loss based on a no-label determination result and a second consistency loss based on a label determination result, the first consistency loss may be determined on the basis of a first sub-no-label determination result obtained by inputting the no-label voxel data into the server object detection model and a second sub-no-label determination result obtained by inputting the flipped no-label voxel data into the server object detection model, and the second consistency loss may be determined on the basis of a first sub-label determination result obtained by inputting the label voxel data into the server object detection model and a second sub-label determination result obtained by inputting the flipped label voxel data into the server object detection model.

According to another aspect of the present invention, there is provided a server for performing semi-supervised learning for object detection in an autonomous vehicle, the server including a communicator configured to receive no-label voxel data from a vehicle and a processor configured to perform a data-based update on a server object detection model on the basis of label voxel data and the no-label voxel data, determine a loss value on the basis of the label voxel data and the no-label voxel data, and perform a loss-based update on the server object detection model using the loss value.

The data-based update may be performed on the basis of the label voxel data, flipped label voxel data obtained by flipping the label voxel data, the no-label voxel data, and flipped no-label voxel data obtained by flipping the no-label voxel data, and the flipped label voxel data and the flipped no-label voxel data may be generated through flipping based on a travel direction of the vehicle.

The loss value may include a supervised loss and a consistency loss, the supervised loss may be determined on the basis of a determination result obtained by inputting object information included in the label voxel data and the label voxel data into the server object detection model, the consistency loss may include a first consistency loss based on a no-label determination result and a second consistency loss based on a label determination result, the first consistency loss may be determined on the basis of a first sub-no-label determination result obtained by inputting the no-label voxel data into the server object detection model and a second sub-no-label determination result obtained by inputting the flipped no-label voxel data into the server object detection model, and the second consistency loss may be determined on the basis of a first sub-label determination result obtained by inputting the label voxel data into the server object detection model and a second sub-label determination result obtained by inputting the flipped label voxel data into the server object detection model.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The present invention will be described in detail below with reference to the accompanying drawings which illustrate specific embodiments in which the present invention can be implemented. These embodiments are described in sufficient detail to enable those of ordinary skill in the art to implement the present invention. It should be understood that various embodiments of the present invention are different but are not necessarily exclusive of each other. For example, embodiments implemented with specific shapes, structures, and features stated in this specification can be switched without departing from the spirit and scope of the present invention. Also, it should be understood that positions or arrangements of individual components in each embodiment can be changed without departing from the spirit and scope of the present invention. Accordingly, the following detailed description is not to be taken in a limiting sense, and the scope of the present invention should be construed as including the scope of the claims and all the equivalents thereof. Throughout the drawings, like reference numerals refer to like elements.

Hereinafter, several exemplary embodiments of the present invention will be described in detail with reference to the accompanying drawings to enable those of ordinary skill in the art to easily implement the present invention.

Figure 1:
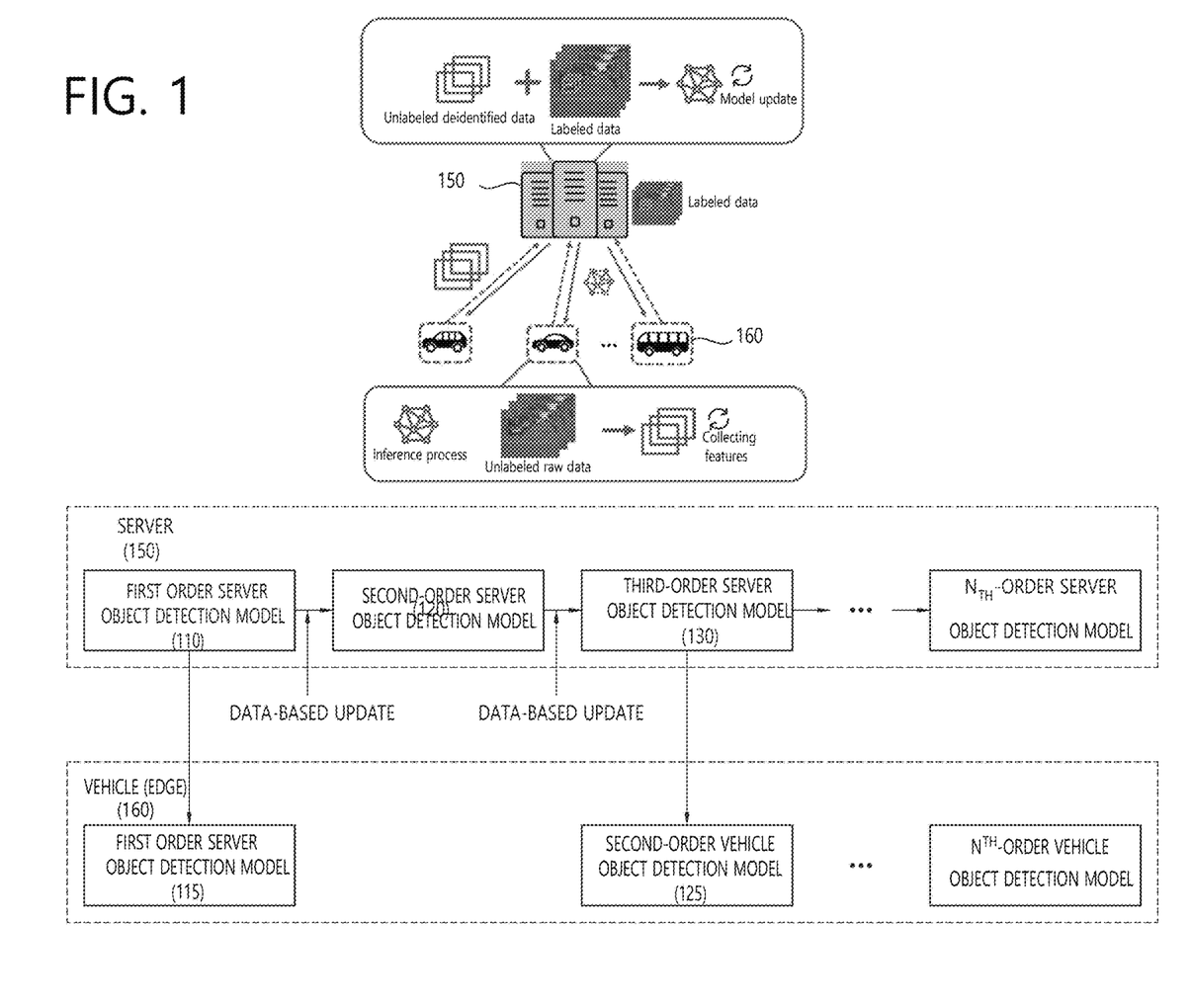
FIG. 1 is a conceptual diagram of a semi-supervised learning method for object detection in an autonomous vehicle according to an exemplary embodiment of the present invention.

FIG. 1 is a conceptual diagram of a semi-supervised learning method for object detection in an autonomous vehicle according to an exemplary embodiment of the present invention.

FIG. 1 illustrates a method of performing semi-supervised learning for object detection in an autonomous vehicle on the basis of data input from a server and a vehicle.

Referring to FIG. 1, semi-supervised learning for object detection is started on the basis of data communication between a server 150 and a vehicle 160.

At the server 150, object detection learning may be performed on the basis of labeled voxel data such that a first-order server object detection model 110 may be generated. The labeled voxel data may be voxel data in which an object in an image is labeled. The server 150 may transmit the first-order server object detection model 110 to the vehicle (or edge) 160. The labeled voxel data used at the server 150 may be referred to as "label voxel data." The first-order server object detection model 110 transmitted to the vehicle 160 may be referred to as a "first-order vehicle object detection model 115."

The vehicle 160 may perform object detection on the basis of the first-order vehicle object detection model 115, and image data captured at the vehicle 160 may be voxelized and transmitted to the server 150 as voxel data. The voxel data transmitted from the vehicle 160 has not been labeled, and the unlabeled voxel data may be referred to as "no-label voxel data."

In the server 150, each of the label voxel data and the no-label voxel data is transmitted to the first-order server object detection model 110, and the first-order server object detection model 110 may be additionally trained on the basis of the label voxel data and the no-label voxel data such that an updated second-order server object detection model 120 may be generated. The update of the server object detection model based on the label voxel data and the no-label voxel data may be referred to as a "data-based update."

The second-order server object detection model 120 may be additionally updated on the basis of a loss value, which is calculated on the basis of a loss function of the label voxel data and the no-label voxel data, such that a third-order server object detection model 130 may be generated. The update of the server object detection model based on the loss value may be referred to as a "loss-based update."

The loss function may determine a loss value on the basis of a consistency loss based on a supervised loss of the label voxel data, the label voxel data, flip label voxel data obtained by flipping the label voxel data, the no-label voxel data, and flipped no-label voxel data obtained by flipping the no-label voxel data. The determined loss value may be transmitted to the second-order server object detection model 120 and used for generating a third-order server object detection model 130.

In this way, a server object detection model may be continuously updated on the basis of no-label voxel data transmitted from the vehicle 160, and the updated server object detection model may be transmitted back to the vehicle 160. The third-order server object detection model 130 transmitted to the vehicle 160 may be a second-order vehicle object detection model 125.

The third-order server object detection model 130 may be continuously updated on the basis of data and a loss value such that an $n^{th}$-order server object detection model may be generated. The $n^{th}$-order server object detection model may be transmitted to the vehicle 160 and operate as an $n^{th}$-order vehicle object detection model. More specifically, when an evaluation result based on test data of the $n^{th}$-order server object detection model is improved, the $n^{th}$-order server object detection model may be transmitted to the vehicle 160 and operate as the $n^{th}$-order vehicle object detection model.

In this way, the vehicle 160 can perform object detection on the basis of a continuously updated object detection model.

Also, in the present invention, it is possible to improve learning efficiency while simultaneously using labeled voxel data and unlabeled voxel data and continuously upgrade an object detection model on the basis of voxel data received from a vehicle even while reducing the cost and effort put into labeling.

Figure 2:
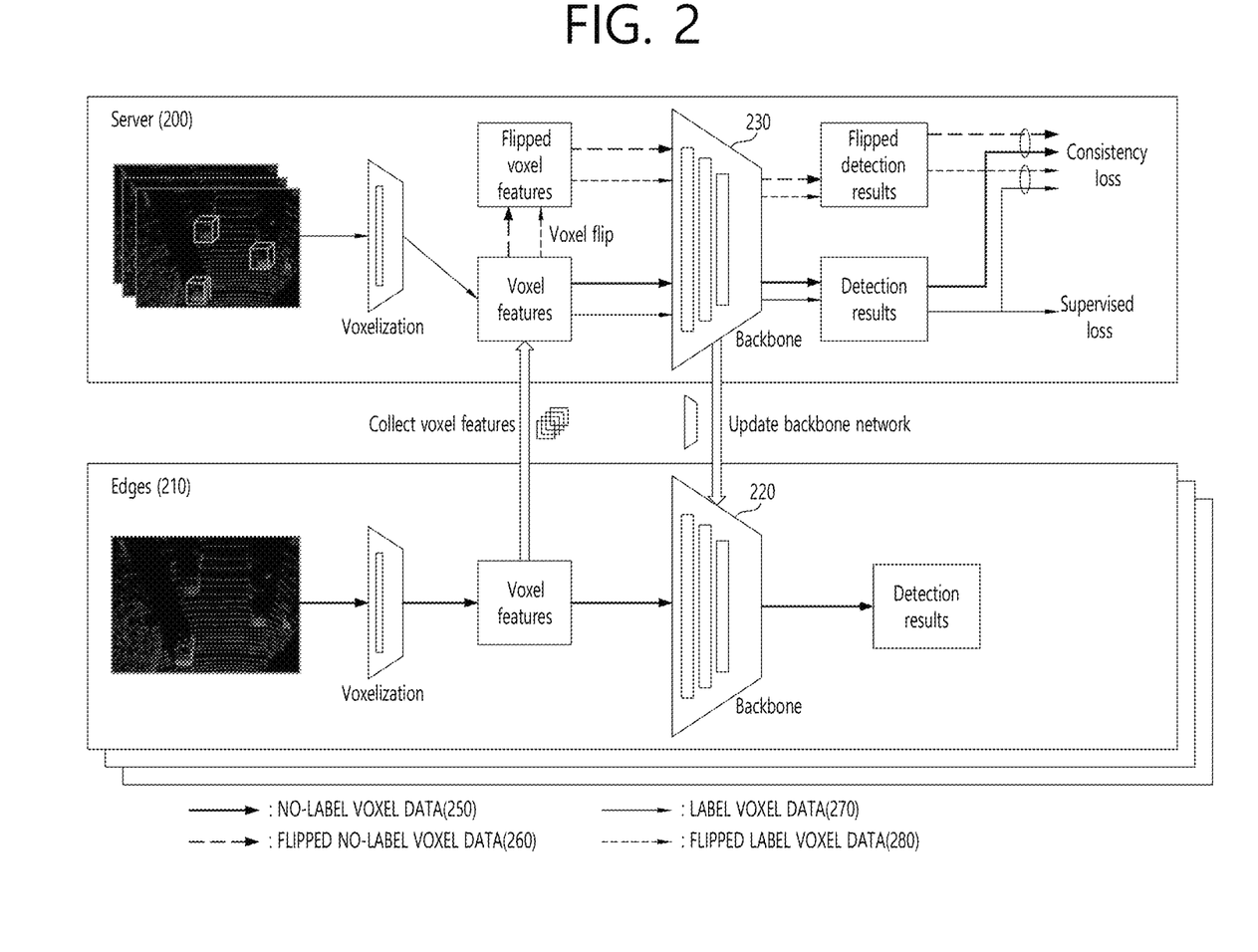
FIG. 2 is a conceptual diagram of a semi-supervised learning system for object detection in an autonomous vehicle according to an exemplary embodiment of the present invention.

FIG. 2 is a conceptual diagram of a semi-supervised learning system for object detection in an autonomous vehicle according to an exemplary embodiment of the present invention.

FIG. 2 illustrates a semi-supervised learning system including a server and vehicles (or edges).

Referring to FIG. 2, a learning operation performed by the server 200 and the edges (vehicles) 210 is illustrated.

For convenience of description, learning in an operation after a vehicle object detection model 220 is already installed in the vehicles 210 and the vehicles 210 transmit no-label voxel data is described.

The vehicles 210 may generate no-label voxel data by voxelizing captured images. The voxel data may also be referred to as "voxel features." No-label voxel data 250 may be input to the vehicle object detection model 220 installed in the vehicles 210 and used for detecting objects included in the images. The no-label voxel data 250 may be transmitted to the server 200 and used for updating a server object detection model 230.

The server 200 may voxelize the images, and label voxel data 270 labeled with information on the objects (object classification, object positions, etc.) may be generated. A part of the server 200 that generates the label voxel data 270 may be referred to as a "voxelization part."

The label voxel data 270 generated by the server 200 and the no-label voxel data 250 generated by the vehicles 210 may be flipped. Flipped label voxel data 280 may be generated by flipping the label voxel data 270, and flipped no-label voxel data 260 may be generated by flipping the no-label voxel data 250. A part that generates the flipped label voxel data 280 by flipping the label voxel data 270 and generates the flipped no-label voxel data 260 by flipping the no-label voxel data 250 may be referred to as a "flipping part."

According to an exemplary embodiment of the present invention, image processing other than flipping (rotation, symmetrizing, expansion or contraction of voxels) may be performed. Flipped label voxel data may also be referred to as "image processing label voxel data," and flipped no-label voxel data may also be referred to as "image processing no-label voxel data." Such an embodiment may also be included in the scope of the present invention.

The no-label voxel data 250, the flipped no-label voxel data 260, the label voxel data 270, and the flipped label voxel data 280 may be input to the server object detection model 230 such that the server object detection model 230 may be updated. As described above, an update based on the no-label voxel data 250, the flipped no-label voxel data 260, the label voxel data 270, and the flipped label voxel data 280 may be referred to as a "data-based update."

Also, the server object detection model 230 may be additionally updated on the basis of a first consistency loss, which is based on a no-label determination result from the no-label voxel data 250 and the flipped no-label voxel data 260, a second consistency loss, which is based on a label determination result from the label voxel data 270 and the flipped label voxel data 280, and a supervised loss, which is based on a supervised determination result on the label voxel data 270. An update of the server object detection model 230 based on a loss value may be referred to as a "loss-based update."

(1) First Consistency Loss Based on No-Label Determination Result

The first consistency loss based on the no-label determination result may be determined on the basis of whether a first sub-no-label determination result obtained by inputting the no-label voxel data 250 into the server object detection model 230 is identical to a second sub-no-label determination result obtained by inputting the flipped no-label voxel data 260 into the server object detection model 230.

(2) Second Consistency Loss Based on Label Determination Result

The second consistency loss based on the label determination result may be determined on the basis of whether a first sub-label determination result obtained by inputting the label voxel data 270 into the server object detection model 230 is identical to a second sub-label determination result obtained by inputting the flipped label voxel data 280 into the server object detection model 230.

(3) Supervised Loss

A supervised loss may be determined on the basis of a determination result obtained by inputting the label voxel data 270 and object information included in the label voxel data 270 into the server object detection model 230.

Information on the consistency loss (the first consistency loss and the second consistency loss) and the supervised loss may be transmitted to the server object detection model 230 and used for a loss-based update of the server object detection model 230.

In the server 200, operations may be performed on the basis of a processor.

Figure 3:
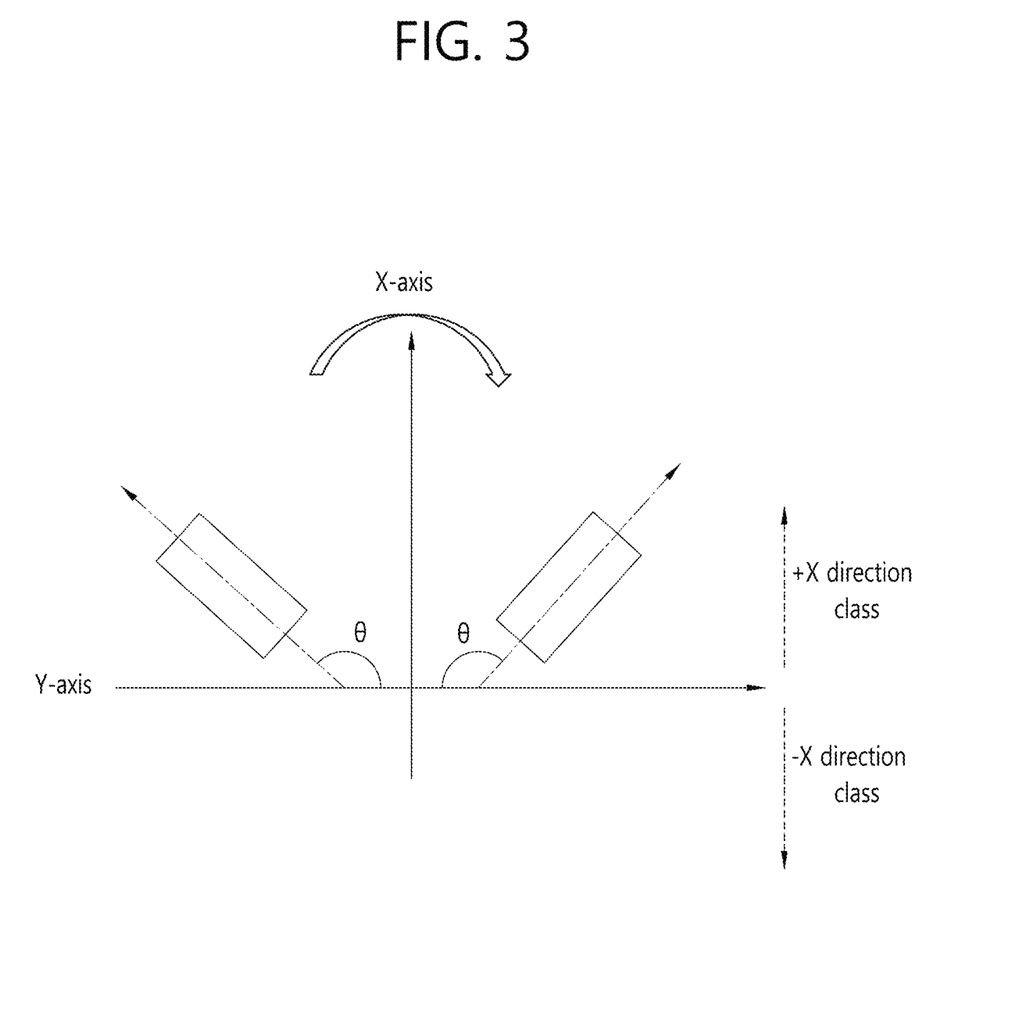
FIG. 3 is a conceptual diagram illustrating flipping according to an exemplary embodiment of the present invention.

FIG. 3 is a conceptual diagram illustrating flipping according to an exemplary embodiment of the present invention.

FIG. 3 illustrates a method of flipping voxel data according to an exemplary embodiment of the present invention.

Referring to FIG. 3, in the present invention, voxel data may be flipped on the basis of a travel direction.

An X direction is the forward direction of a vehicle, and voxel data may be flipped on the basis of the forward direction of the vehicle such that flipped label voxel data or flipped no-label voxel data may be generated.

When an original object angle with respect to a Y axis is $\theta$ in voxel data, the angle of a flipped object may be $\theta'$ with respect to the Y axis. The sum of $\theta$ and $\theta'$ is $\pi$.

Figure 4:
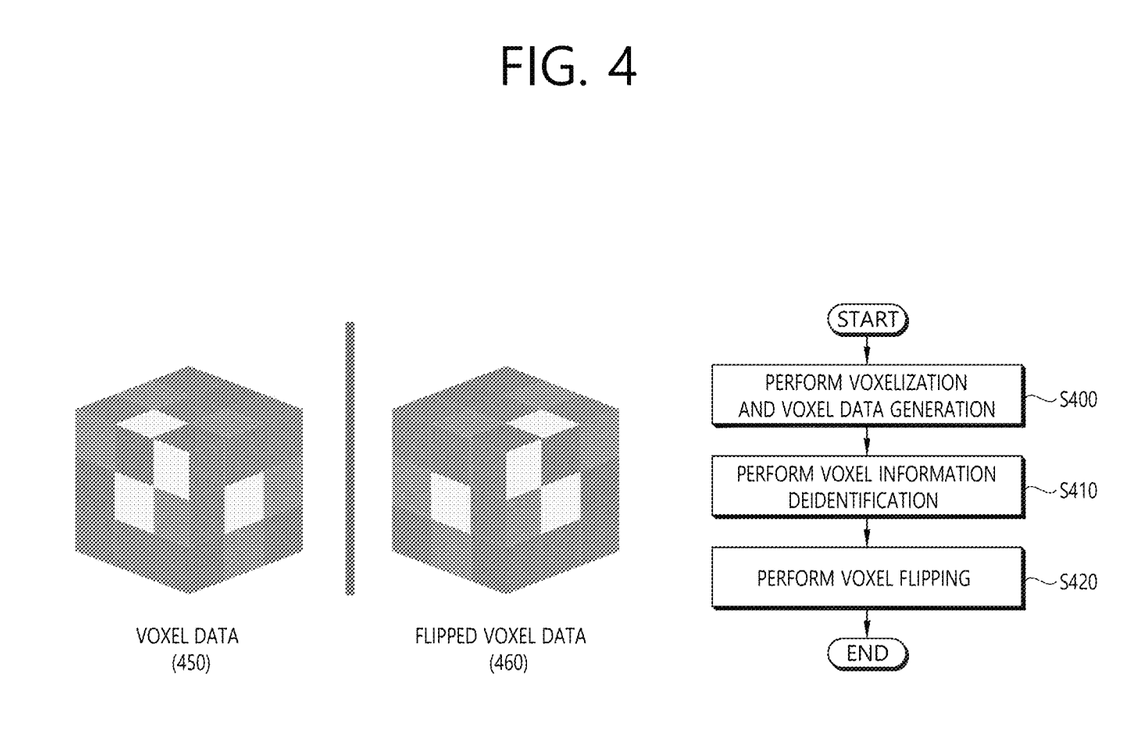
FIG. 4 is a conceptual diagram of voxel data and flipped voxel data according to an exemplary embodiment of the present invention.

FIG. 4 is a conceptual diagram of voxel data and flipped voxel data according to an exemplary embodiment of the present invention.

FIG. 4 illustrates a method of generating voxel data 450 and flipped voxel data 460.

Referring to FIG. 4, the voxel data 450 may be referred to as "voxel features."

Voxelization and voxel data generation are performed (operation S400).

A three-dimensional (3D) region recognized by a LiDAR is divided into identical spaces for voxelization, and points included in individual voxel regions are expressed by features that represent voxels such that voxel data may be generated.

Voxel information deidentification is performed (operation S410).

Voxel data contained in each voxel may be derived not from actual information of each point but from a relative value representing a relationship with the corresponding voxel such that deidentification may be performed. Such deidentification can strengthen the security of an object in an image.

Voxel flipping is performed (operation S420).

A flipping procedure of reversing voxel data is performed by reversing the position of each voxel with respect to a reference axis.

Flipped label voxel data and flipped no-label voxel data may be generated through the voxel flipping procedure.

When such voxel data is used, it is possible to increase a data compression rate and protect security information and personal information in an image through a voxel data deidentification procedure.

Figure 5:
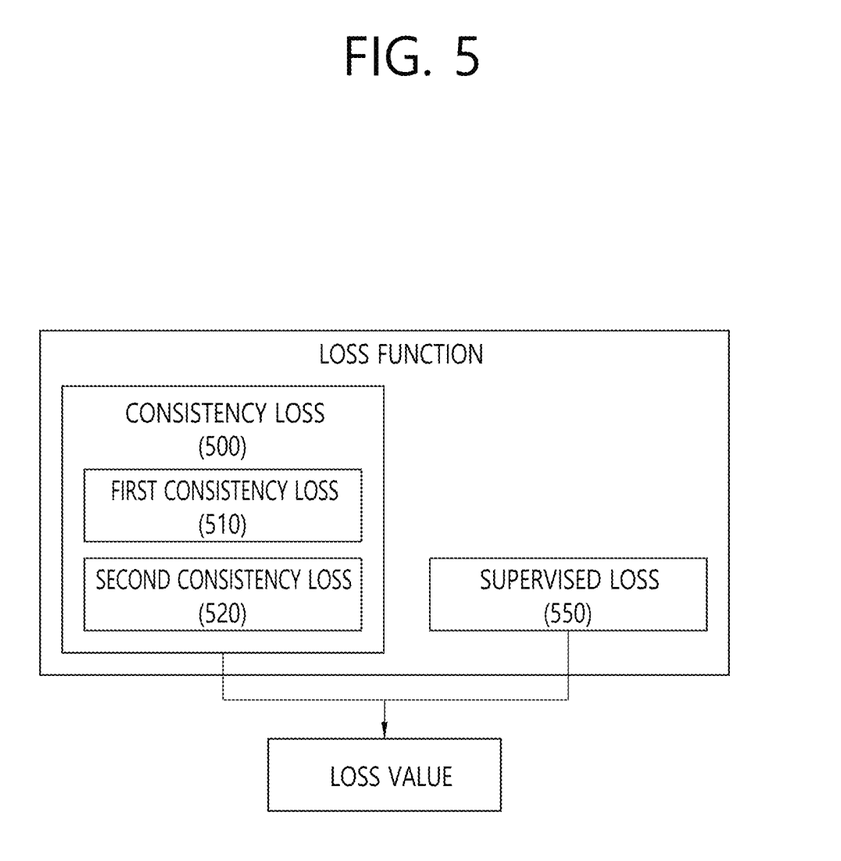
FIG. 5 is a block diagram of a loss function according to an exemplary embodiment of the present invention.

FIG. 5 is a block diagram of a loss function according to an exemplary embodiment of the present invention.

FIG. 5 illustrates a method of determining a loss value on the basis of a consistency loss (a first consistency loss 510 and a second consistency loss 520) 500 and a supervised loss 550.

Referring to FIG. 5, a loss function is given as Equation 1 below.

$$\mathcal{L} = \mathcal{L}_c + \mathcal{L}_l + w(t) \cdot \mathcal{L}_{con} \qquad \text{<Equation 1>}$$

$L_c$ denotes a loss value of an object classification in the supervised loss 550.

$L_l$ denotes a loss value of an object position in the supervised loss 550.

w(t) denotes a weight value for the consistency loss 500.

$L_{con}$ denotes a consistency loss value.

A consistency loss value may include a loss value of an object classification and a loss value of an object position.

Equation 2 below represents a loss value of an object position in the consistency loss 500.

$$L_l = \frac{1}{7}(|cx - cx'|^2 + |cy + cy'|^2 + |cz - cz'|^2 + \qquad \text{< Equation 2 >}$$
$$|w - w'|^2 + |h - h'|^2 + |l - l'|^2 + \sin^2(\theta + \theta'))$$

In other words, the loss value of the object position may be calculated on the basis of a difference value between an original position (cx, cy, cz) and a flipped position (cx', cy', cz'), a spatial difference value, and a difference value between angles with respect to the Y axis.

The loss value of the object classification may be calculated on the basis of a mean square error (MSE).

For convenience of description, the present invention has been described on the basis of flipping, but various kinds of image processing other than flipping may be performed by the same algorithm.

For example, image processing other than flipping, such as rotation, symmetrizing, expansion and contraction of voxels, etc., may be performed, and a consistency loss (a first consistency loss and a second consistency loss) and a supervised loss may be determined and used for a loss-based update of a server object detection model.

Image processing may be performed on label voxel data generated by a server and no-label voxel data generated by a vehicle. Image-processed label voxel data may be generated by performing image processing on the label voxel data, and image-processed no-label voxel data may be generated by performing image processing on the no-label voxel data. A part that generates the image-processed label voxel data by performing image processing on the label voxel data and generates the image-processed no-label voxel data by performing image processing on the no-label voxel data may be referred to as an image processor.

According to the present invention, it is possible to improve learning efficiency while simultaneously using labeled voxel data and unlabeled voxel data and continuously upgrade an object detection model on the basis of voxel data received from a vehicle even while reducing the cost and effort put into labeling.

Also, according to the present invention, it is possible to generate voxel data for an image and protect personal information through a deidentification procedure for the voxel data in artificial-intelligence-based learning.

The above-described exemplary embodiments of the present invention may be implemented in the form of computer instructions that are executable by various computer components and may be recorded on a computer-readable recording medium. The computer-readable recording medium may include program instructions, data files, data structures, etc. solely or in combination. The program instructions recorded on the computer-readable recording medium may be specially designed and prepared for the present invention or may be instructions that are well known and available to those of ordinary skill in the field of computer software. Examples of the computer-readable recording medium include magnetic media, such as a hard disk, a floppy disk, and a magnetic tape, optical media, such as a compact disc read-only memory (CD-ROM) and a digital versatile disc (DVD), magneto-optical media, such as a floptical disk, and hardware devices, such as a ROM, a random access memory (RAM), a flash memory, etc., that are specially made to store and execute program instructions. Examples of the program instructions may include not only machine language code generated by a compiler but also high-level language code that is executable by a computer using an interpreter and the like. The hardware devices may be switched with one or more software modules to perform operations of the present invention and vice versa.

While the present invention has been described with reference to specific items, such as particular components, and limited embodiments and drawings, these embodiments are merely provided to help understanding the present invention, and the present invention is not limited thereto. Those of ordinary skill in the art can make various alterations and modifications from the embodiments.

Therefore, the spirit of the present invention should not be limited to the above-described embodiments, and it should be construed that the following claims and all equivalents or equivalent modifications of the claims will fall within the scope of the present invention.

What is claimed is:

1. A semi-supervised learning method for object detection in an autonomous vehicle, the semi-supervised learning method comprising:

receiving, by a server, no-label voxel data from a vehicle;

performing, by the server, a data-based update on a server object detection model on the basis of label voxel data and the no-label voxel data;

determining, by the server, a loss value on the basis of the label voxel data and the no-label voxel data; and performing, by the server, a loss-based update on the server object detection model using the loss value, wherein the loss value includes a supervised loss and a consistency loss, the supervised loss is determined on the basis of a determination result obtained by inputting object information included in the label voxel data and the label voxel data into the server object detection model, the consistency loss includes a first consistency loss based on a no-label determination result and a second consistency loss based on a label determination result, the first consistency loss is determined on the basis of a first sub-no-label determination result obtained by inputting the no-label voxel data into the server object detection model and a second sub-no-label determination result obtained by inputting the image-processed no-label voxel data into the server object detection model, and the second consistency loss is determined on the basis of a first sub-label determination result obtained by inputting the label voxel data into the server object detection model and a second sub-label determination result obtained by inputting the image-processed label voxel data into the server object detection model.

2. The semi-supervised learning method of claim 1, wherein the data-based update is performed on the basis of the label voxel data, image-processed label voxel data obtained by performing image processing on the label voxel data, the no-label voxel data, and image processed no-label voxel data obtained by performing image processing on the no-label voxel data, and the image-processed label voxel data and the image-processed no-label voxel data are generated through image processing based on a travel direction of the vehicle.

3. A server for performing semi-supervised learning for object detection in an autonomous vehicle, the server comprising:

a communicator configured to receive no-label voxel data from a vehicle; and a processor configured to perform a data-based update on a server object detection model on the basis of label voxel data and the no-label voxel data, determine a loss value on the basis of the label voxel data and the no-label voxel data, and perform a loss-based update on the server object detection model using the loss value, wherein the loss value includes a supervised loss and a consistency loss, the supervised loss is determined on the basis of a determination result obtained by inputting object information included in the label voxel data and the label voxel data into the server object detection model, the consistency loss includes a first consistency loss based on a no-label determination result and a second consistency loss based on a label determination result, the first consistency loss is determined on the basis of a first sub-no-label determination result obtained by inputting the no-label voxel data into the server object detection model and a second sub-no-label determination result obtained by inputting the image-processed no-label voxel data into the server object detection model, and the second consistency loss is determined on the basis of a first sub-label determination result obtained by inputting the label voxel data into the server object detection model and a second sub-label determination result obtained by inputting the image-processed label voxel data into the server object detection model.

4. The server of claim 3, wherein the data-based update is performed on the basis of the label voxel data, image-processed label voxel data obtained by performing image processing on the label voxel data, the no-label voxel data, and image-processed no-label voxel data obtained by performing image-processing on the no-label voxel data, and the image-processed label voxel data and the image-processed no-label voxel data are generated through image processing based on a travel direction of the vehicle.

* * * * *